310-11 SR

F213A XR 3,258,685

June 28, 1966 H. B. HORTON 3,258,685

FLUID-ELECTRO TRANSDUCER

Filed April 22, 1963

INVENTOR
HAROLD B. HORTON

BY

Griffin and Stokes
ATTORNEYS

United States Patent Office 3,258,685 Patented June 28, 1966

3,258,685

FLUID-ELECTRO TRANSDUCER

Harold B. Horton, New Canaan, Conn., assignor to Sperry Rand Corporation, New York, N.Y., a corporation of Delaware Filed Apr. 22, 1963, Ser. No. 274,667
12 Claims. (Cl. 324—34)

The present invention relates to a novel fluid-electro transducer device, and more particularly, to one wherein fluid flow in a channel may be converted into an electrical manifestation by the electrical charging of moving fluid particles.

The invention herein disclosed finds novel and particular, although not exclusive, use in the field of pure fluid amplifiers. These amplifiers are a comparatively recent addition to the data processing and control system arts. The amplifiers are small, rugged, and inexpensive. They may be constructed of plastic, metal, or ceramic material, and basically comprise a plurality of interconnected fluid conduits. For further information concerning the characteristics and mode of operation of pure fluid amplifiers, reference should be made to the publications entitled "Science and Mechanics," June 1960, and "System Design," April 1960. As explained in the aforementioned publications, a pure fluid amplifier is responsive to fluid control signals of relatively low energy for producing fluid output power signals of relatively high energy. For certain environments it may be desirable to directly convert the output power signal of a pure fluid amplifier into an electrical manifestation. This invention provides means for accomplishing this result without the inclusion of any moving parts.

Therefore, an object of the present invention is to provide a transducer which permits conversion of a fluid signal directly into an electrical signal without moving parts.

Another object of the present invention is to provide means for converting the output of a pure fluid amplifier into an electrical signal.

Yet another object of the present invention is to permit the conversion of fluid signals into electrical signals by first charging moving fluid particles, then directing said particles through magnetic or electrical field detecting means whereby electrical signals are induced therein.

Further objects of the present invention will become apparent during the course of the following description which is to be read in view of the drawings, in which.

Figures 1, 2A, 3:
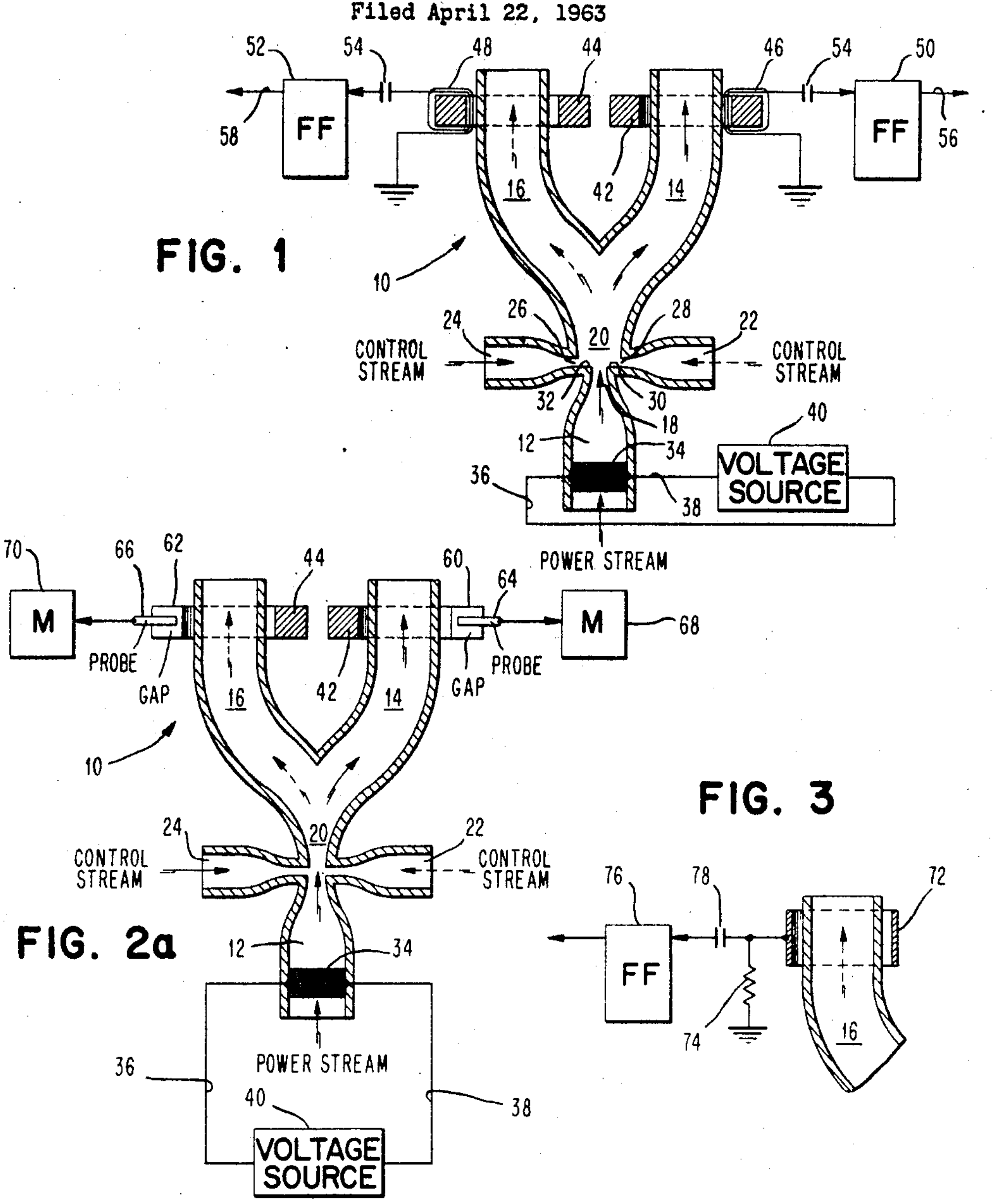
FIGURE 1 shows a bistable pure fluid amplifier with magnetic output transducer means.
FIGURES 2A and 2B show a proportional pure fluid amplifier with magnetic output transducer means.
FIGURE 3 shows a modification of the invention whereby electrostatic output transducer means are provided.

Referring first to FIGURE 1, there is shown a bistable pure fluid amplifier generally indicated by reference numeral 10 whose output fluid signal is directly converted into an electrical manifestation by magnetic means. This fluid amplifier comprises a substantially tubular body having an input duct 12, and right and left output ducts 14 and 16, respectively. A fluid source, such as a compressor (not shown), continuously supplies a power stream fluid such as air or other gas, or a liquid, to input duct 12 from whence it passes through a constricted orifice or nozzle 18 into an interaction chamber 20. In order to deflect the power stream into either output channel 14 or output channel 16, control fluid streams may be selectively applied to interaction chamber 20 via conduits 22 and 24 from sources not shown in FIGURE 1.

As is well known in the pure fluid art, a power stream of relatively large energy may be physically deflected without losing its integrity by means of a control stream of lesser energy impinging thereon at substantially a right angle. Thus, if control stream fluid is applied to conduit 24 so that it issues into interaction chamber 20 via nozzle 26, the power jet stream issuing from nozzle 18 is deflected into output channel 14. On the other hand, if control stream fluid is introduced into duct 22 from whence it issues from nozzle 28, the power stream will instead be deflected into output channel 16. In order to provide a bistable characteristic, i.e., a characteristic whereby the power stream remains in the output channel to which it is deflected even after termination of the deflecting control stream, the amplifier is constructed to exhibit the well known boundary layer effect which causes the power stream to lock onto the outer wall of an output channel to which it is deflected. This phenomenon is due to the entrainment of molecules in the region between said outer wall and said power stream so as to lower the pressure therein. Consequently, once the power stream is completely deflected into either output channel 14 or 16 by a control stream, said control stream may be subsequently terminated without causing the power stream to swing back toward the center of chamber 20. In observing an output channel, therefore, there are only two fluid states existing therein depending upon whether the power stream is or is not flowing therethrough. By offsetting the outer walls of chamber 20 from nozzle 18, as indicated by regions 30 and 32, the boundary layer effect can be enhanced.

The description so far relates to a pure fluid bistable amplifier well known in the prior art and with which the present invention is particularly adapted for use. In many environments the fluid output signal from such an amplifier must be converted into an electrical signal for operating related circuits. This function is performed in a novel manner for components now to be described. Disposed within input duct 12 is a grid-like structure 34 which is connected by leads 36 and 38 to a source of ionizing potential 40 for generating a corona discharge in the duct in the manner of electrostatic precipitation of dust particles. Grid 34 comprises a network of wires or filaments arranged in a manner to offer minimum resistance to power stream flow therein, but at the same time to provide a plurality of parallel channels through which the power stream fluid passes. As the fluid particles pass through the grid, they are given an electric charge which may be either negative or positive depending upon the polarity of the ionizing voltage. The grid is selectively given either a negative or positive charge and the particles or molecules contacting the grid assume the same charge as the grid. The charging of fluid particles in this manner is illustrated in Canadian Patent No. 538,851. The actual molecules of the fluid can be ionized, or alternatively, the power stream fluid may carry particles of a different substance which are in turn charged by exposure to the corona discharge. Other means for charging particles may be used, as by frictional contact or the like. For the purpose of this explanation, it will be assumed that the charge so given is negative.

Disposed in proximity with at least one of the output channels is a transducer for detecting the passage of charged particles therethrough. In FIGURE 1, this transducer takes the form of means for detecting the magnetic field set up by the motion of charged particles in the output channel. As is well known in the study of electricity, a current of moving charged particles such as electrons generates a magnetic field which is concentric about the axis of particle flow. In FIGURE 1, channels 14 and 16 have arranged thereabout magnetic core material 42 and 44, respectively, in a shape of a toroid. Each toroid provides a low reluctance path for the flux lines of the magnetic field set up around the output channel due to the pasage of charged particles therethrough. These flux lines have a direction around the output channel such that they enter the plane of FIGURE 1 and emerge therefrom on the right and left sides, respectively, of said output channel. Coils 46 and 48 are wound about cores 42 and 44, respectively, in each of which is induced a voltage pulse whenever there is a change in magnitude of this magnetic field at the time that power stream flow in an output channel is interrupted or initiated. The polarity of the induced voltage in coils 46 and 48 is used to set or clear electronic circuits such as flip-flops 50 and 52, respectively, in order that they can indicate the presence or absence of power stream flow in the respective associated output channel. A coupling capacitor 54 and 56 can be used to differentiate the induced voltage pulse from the coil in order to provide a sharp triggering spike to the input of the associated flip-flop.

The operation of FIGURE 1 will now be described. Assume initially that power stream flow is locked in output channel 14 only, and that flip-flop 50 is in its set condition so that a potential of some value appears on its output lead 56 to indicate that the power stream takes this path of flow. Flip-flop 52 is further assumed to be in its clear condition so that a potential of different value appears on its output 58 indictaing no power stream flow in output channel 16. If now control stream fluid is temporarily introduced into duct 22, the power stream issuing from nozzle 18 is deflected into output channel 16 and away from output channel 14. The termination of flow in output channel 14 causes the disappearance of the magnetic field in core 42. The consequent change in flux lines linking coil 46 thereby induces therein a temporary voltage pulse of some particular polarity which in turn is transmitted via capacitor 54 to clear flip-flop 50, thus indicating that there is no longer power stream flow in channel 14. The initiation of power stream flow in channel 16 causes the creation of a magnetic field in core 44, so that a temporary voltage pulse of opposite polarity is induced in coil 48 which thereupon sets flip-flop 52. Flip-flop 52 when set produces a potential on output lead 58 indicating that power stream flow has been initiated in channel 16. The control stream in duct 22 can now be terminated without the power stream switching back into channel 14.

If a control stream is now applied to duct 24, the power stream switches back into output channel 14. This immediately establishes a magnetic field in core 42 which consequently induces a temporary voltage pulse in coil 46 of polarity opposite from that induced therein during the operation previously described above. This voltage is transmitted to set flip-flop 50, thus indicating power stream flow in output channel 14. In channel 16, the disappearace of power stream flow therein induces a voltage pulse in coil 48 which is of opposite polarity from that used to set flip-flop 52. This voltage pulse clears flip-flop 52, which is taken to indicate the absence of power stream flow in output channel 16.

Figure 2B:
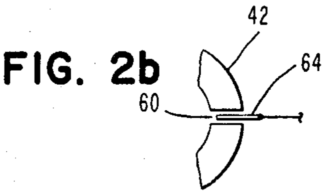

It will be noted from the above that the magnetic transducer of FIGURE 1 only indicates that a change has occurred in the power stream flow condition within the respective output channel, but does not specify the magnitude of power stream flow therein. The latter function is not necessary inasmuch as pure fluid amplifier 10 is bistable and has only two possible outputs each of predetermined magnitude, according to whether the power stream flows or does not flow through an output channel. However, pure fluid amplifiers of the proportional type are quite common in which the power stream divides between the two output channels according to the particular energy of control stream input. Such a fluid amplifier is shown in FIGURE 2A and is quite similar to that of FIGURE 1. Like parts in FIGURES 1 and 2A are indicated by like reference numerals in order to avoid the need for a detailed description of the FIGURE 2A amplifier. In FIGURE 2A, however, the degree of power stream deflection depends upon the value of its impinging control stream, so that the fluid signal obtained from an output channel is proportional to the value of control stream input. Hence, there is no bistable characteristic in FIGURE 2A. One of the features which makes this possible is that there is no set back provided downstream from each control jet, as in the case of FIGURE 1. The output magnetic transducer in this case should be able to determine the amount of power stream flow in an output channel, as opposed to mere detection of power stream flow as is only required in FIGURE 1. It is well known the value of the magnetic field is set up about a moving stream of charged particles is proportional to the quantity of charged particles passing a given cross-sectional locaiton per unit time. Consequently, the value of flux existing in core 42 or core 44 will depend upon the quantity of power stream fluid in the associated output channel. Whenever the power stream flow in an output channel is altered, as for example increasing or decreasing the impinging control stream, then the absolute value of flux in the core changes accordingly. By providing air gaps 60 and 62 in cores 42 and 44, respectively, magnetic flux measuring probes 64 and 66, respectively, can be introduced into the magnetic field. This arrangement is best shown in FIGURE 2B. Each probe can be respectively connected to magnetic field strength meters 68 and 70 (for example, like one shown in the U.S. Patent No. 2,562,120 to Pearson) in order to determine the absolute magnitude of flux. Other well known means for measuring the absolute value of flux may also be utilized in the embodiment of FIGURE 2A. Therefore, FIGURE 2A is a scheme whereby the absolute magnitude of fluid flow in an output conduit can be converted into an electrical manifestation by charging the fluid flow which in turn sets up a magnetic field whose strength is dependent upon the magnitude of fluid flow.

Electrostatic transducer means may also be provided to detect the electric field set up by the charged particles in an output conduit. This variation is shown in FIGURE 3 whereby the output channel 16 (of amplifier 10 in FIGURE 1) may be provided with a capacitor plate 72 instead of magnetic core 44. This plate is external to duct 16 and surrounds same but is insulated therefrom. The plate is electrically connected to a source, such as ground, of positive and negative charges through a dropping resistor 74. The junction between resistor 74 and plate 72 may be connected to an indictaing flip-flop 76 by a coupling capacitor 78. In operation, the establishment of power stream flow in output channel 16 places electrical charges within the interior of duct 16 opposite plate 72. These electrical charges (assumed here to be negative), cause a corresponding positive charge to be induced on plate 72 in accordance with the well-known principles of electrostatics. This means that electrons leave said plate and travel through resistor 74 to ground, thus causing a temporary current to flow through resistor 74 which raises the potential of the junction. Said potential is coupled to flip-flop 76 to set same for indicating power stream flow in channel 16. When power stream flow in this channel is terminated, as by the deflection of the power stream into output channel 14, then electrons are withdrawn from the ground source and sent to plate 72 which causes current of the opposite polarity to temporarily flow in resistor 74. This current temporarily decreases the junction potential which in turn is transmitted to clear flip-flop 76 to indicate absence of power stream flow. A similar electrostatic transducer may be provided in output channel 42 for giving complementary signals. Furthermore, well known means for measuring the absolute value of an electric field within the channel may be employed wherever a proportional fluid amplifier is to be used.

While the preferred embodiments of the present invention have been shown and described, it is obvious that modifications thereto may be made by persons skilled in the art without departing from the novel principles as set forth in the appended claims.

The embodiments of the invention in which an exclusive property or privilege is claimed are defined as follows:

1. A fluid-electro transducer which comprises:

(a) a pure fluid amplifier of the type including an input duct, for receiving a fluid power stream of moving particles, a plurality of output signal ducts, and at least one fluid control stream input duct for selectively directing said power stream to said output signal ducts;

(b) first means situated in proximity with said power stream for giving at least some of its said moving particles an electrical charge whereby said charged particles generate an electro-magnetic field; and (c) second means located in proximity with at least one of said output signal ducts and situated downstream from said first means, for detecting the field of charged power stream particles which may be flowing therethrough.

2. The invention according to claim 1 wherein said second means includes a coil positioned so as to be linked by flux of the magnetic field generated by said charged power stream particles.

3. The invention according to claim 1 wherein said first means ionizes the fluid molecules of said power stream.

4. A fluid-electro transducer which comprises:

(a) a pure fluid amplifier of the type including an input duct for receiving a fluid power stream of moving particles, a plurality of output signal ducts, and at least one fluid control stream input for selectively directing said power stream to said output signal ducts;

(b) first means situated within said power stream input duct for giving at least some of said power stream moving particles an electrical charge whereby said charged particles generate an electro-magnetic field; and (c) second means loctaed in proximity with at least one of said output signal ducts for detecting the field of charged power stream particles which may be flowing therethrough.

5. The invention according to claim 4 wherein said first means ionizes the fluid molecules of said power stream.

6. A fluid-electro transducer which comprises:

(a) a pure fluid multi-stable amplifier of the type including an input duct for receiving a fluid power stream of moving particles, a plurality of output signal ducts, and control steam input ducts for selectively directing said power stream to only one of said output signal ducts at a time;

(b) first means situated in proximity with said power stream for giving at least some of its said moving particles an electrical charge whereby said charged particles generate an electro-magnetic field; and (c) second means located in proximity with at least one of said output signal ducts and situated downstream from said first means, for detecting a change in the field of said power stream as it begins or ends its flow therethrough.

7. The invention according to claim 6 wherein said second means includes a coil positioned so as to be linked by flux of the magnetic field generated by said charged power stream.

8. The invention according to claim 6 wherein said first means is situated within said power stream input duct.

9. The invention according to claim 8 wherein said first means ionizes the fluid molecules of said power stream.

10. The invention according to claim 1 wherein said second means includes a capacitor plate positioned so as to detect the electric field generated by said charged power stream.

11. The invention according to claim 4 wherein said second means includes a capacitor plate positioned so as to detect the electric field generated by said charged power stream.

12. The invention according to claim 6 wherein said second means includes a capacitor plate positioned so as to detect the electric field generated by said charged power stream.

References Cited by the Examiner

UNITED STATES PATENTS

| | | | |
|---|---|---|---|
| 1,964,738 | 7/1934 | McCreary | 310—5 |
| 2,004,352 | 6/1935 | Simon | 310—5 |
| 3,080,515 | 3/1963 | Kehoe | 310—2 |
| 3,102,224 | 8/1963 | Malder | 310—11 |

RICHARD B. WILKINSON, *Primary Examiner.*